(12) United States Patent
Wozniak et al.

(10) Patent No.: US 8,334,038 B2
(45) Date of Patent: Dec. 18, 2012

(54) RELEASE LINER HAVING FRICTION COATING, LAMINATE, AND METHODS FOR MANUFACTURING AND USING

(75) Inventors: John C. Wozniak, Rhinelander, WI (US); Dana R. Morton, Rhinelander, WI (US); John Engel, Rhinelander, WI (US)

(73) Assignee: Wausau Paper Mills, LLC, Mosinee, WI (US)

( * ) Notice: Subject to any disclaimer, the term of this patent is extended or adjusted under 35 U.S.C. 154(b) by 277 days.

(21) Appl. No.: 12/290,871

(22) Filed: Nov. 3, 2008

(65) Prior Publication Data

US 2009/0133827 A1    May 28, 2009

Related U.S. Application Data

(60) Provisional application No. 61/001,644, filed on Nov. 2, 2007.

(51) Int. Cl.
| | |
|---|---|
| B32B 9/00 | (2006.01) |
| B32B 33/00 | (2006.01) |
| B32B 7/12 | (2006.01) |
| B32B 3/00 | (2006.01) |
| B32B 7/06 | (2006.01) |
| B32B 15/04 | (2006.01) |
| B32B 5/16 | (2006.01) |

(52) U.S. Cl. ............ 428/41.8; 428/40.1; 428/317.1; 428/317.3; 428/317.7; 428/202; 428/343; 428/352; 428/354; 428/537.5; 428/206; 428/326

(58) Field of Classification Search .......... 428/41.8
See application file for complete search history.

(56) References Cited

U.S. PATENT DOCUMENTS

| | | |
|---|---|---|
| 4,241,142 A | 12/1980 | Kaliski et al. |
| 4,618,657 A | 10/1986 | Katchko et al. |
| 5,084,317 A | 1/1992 | Epple |

(Continued)

FOREIGN PATENT DOCUMENTS

| | | | | |
|---|---|---|---|---|
| EP | 0330 850 | | 9/1989 | |
| WO | WO 2005/052082 | * | 6/2005 | ............ 428/41.8 |

OTHER PUBLICATIONS

Search Report and Written Opinion for PCT/US 08/82255 dated Mar. 19, 2009.

(Continued)

*Primary Examiner* — David Sample
*Assistant Examiner* — Nathan Van Sell
(74) *Attorney, Agent, or Firm* — Merchant & Gould, P.C.

(57) ABSTRACT

A release liner is provided according to the present invention. The release liner includes a clay coated paper substrate having a first surface and a second surface, a silicone coating provided on one of the first surface or the second surface of the clay coated paper substrate, and a friction coating provided on the other of the first surface of the second surface of the clay coated paper substrate. The clay coated paper substrate includes a paper base sheet having a first side, a second side, and a basis weight of about 50 lb/3,000 ft$^2$ to about 100 lb/3,000 ft$^2$, and a clay coating on each of the paper base sheet first side and second side at a weight of about 0.75 lb/3,000 ft$^2$ to about 10 lb/3,000 ft$^2$ per side. Laminates including a release liner and an adhesive backed article are described, and additionally described are methods for manufacturing and using.

22 Claims, 1 Drawing Sheet

U.S. PATENT DOCUMENTS

| | | |
|---|---|---|
| 5,571,557 A | 11/1996 | De Bastiani et al. |
| 5,879,512 A * | 3/1999 | McGenity et al. ............ 162/135 |
| 5,977,021 A | 11/1999 | Aoyama et al. |
| 6,022,050 A | 2/2000 | Kline |
| 6,110,552 A | 8/2000 | Casey et al. |
| 6,231,922 B1 | 5/2001 | Kline |
| 7,026,024 B2 | 4/2006 | Chang et al. |
| 2004/0137242 A1 | 7/2004 | Bednarik et al. |
| 2007/0166501 A1 | 7/2007 | Seitz et al. |

OTHER PUBLICATIONS

Carbon and Graphite Fibers to Chlorocarbons and Chlorohydrocarbons-$C_1$; Encyclopedia of Chemical Technology, Fourth Edition, vol. 5, 20 pages. 1997.

Cabon Fiber; printed Jun. 14, 2007; 5 pages.

\* cited by examiner

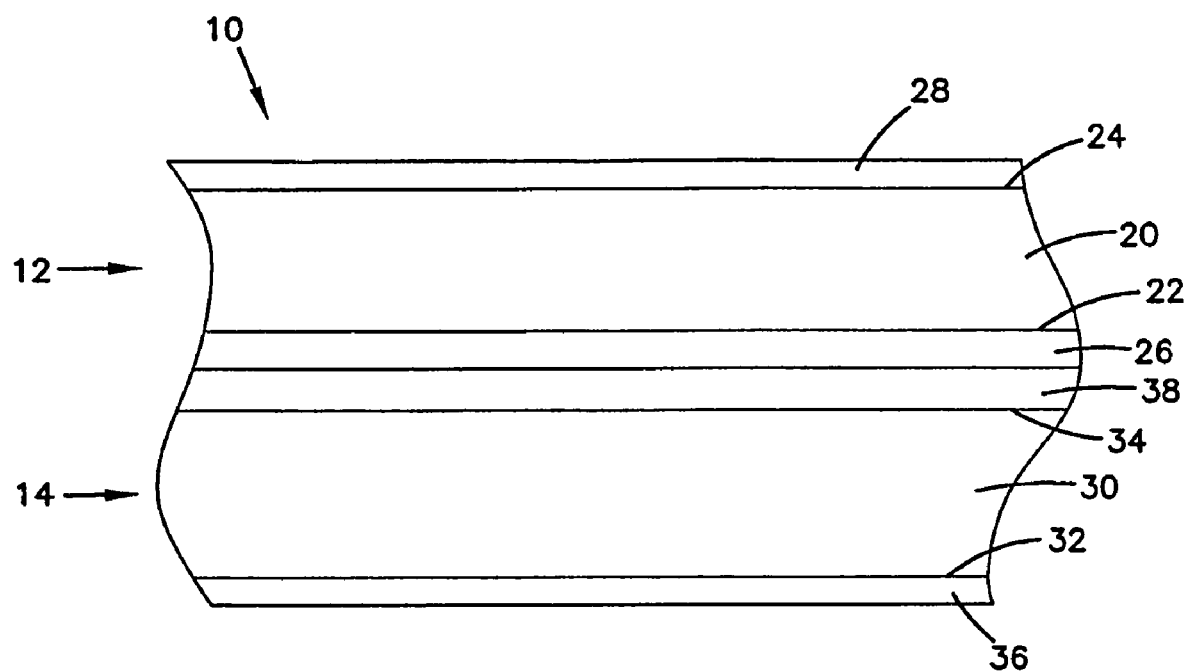

RELEASE LINER HAVING FRICTION COATING, LAMINATE, AND METHODS FOR MANUFACTURING AND USING

CROSS REFERENCE TO RELATED APPLICATIONS

This application claims priority to U.S. provisional patent application No. 61/001,644 that was filed with the United States Patent and Trademark Office on Nov. 2, 2007. The entire disclosure of U.S. provisional patent application No. 61/001,644 is incorporated herein in its entirety.

FIELD OF THE INVENTION

The present invention relates to a release liner having a friction coating, a laminate including a release liner and an adhesive coated article, a method for manufacturing a release liner, and a method for using a release liner. The release liner can be provided as a clay coated paper substrate having a silicone release layer on one side and a friction coating on the other side. The adhesive coated article can be provided as a label having an adhesive layer on one side and a printing surface on the other side. The combination of the release liner and the label can be referred as a label laminate.

BACKGROUND OF THE INVENTION

Release liners are often used in situations where it is desirable to deliver an adhesive backed article such as a label for subsequent use or application to another surface. In general, the adhesive backed article is applied to the release liner so that the adhesive on the article contacts the release surface of the release liner. The release liner can be peeled away from the adhesive backed article to allow the adhesive backed article to be used. Alternatively, the combination of the release liner and the adhesive backed article can be used. That is, the adhesive backed article and the release liner are commonly used together.

A release liner generally includes a substrate and a release surface. Exemplary substrates include films (e.g., vinyl) and polymer coated paper (e.g., polyethylene coated paper sometimes referred to as polycoated paper). The release surface can be formed on the substrate as a result of a coating composition that provides release properties when applied to the substrate. A widely used class of release coating compositions includes those based on silicone polymers such as polydimethylsiloxane polymers. Coating compositions based on polydimethylsiloxane chemistry are available as emulsions, solvent solutions, and as solventless materials. Friction coatings have been provided on polycoated paper to enhance the feed characteristics of the release liner in a printer. For example, the friction coating can assist with feeding the release liner and adhesive backed article through a printer.

Exemplary adhesive backed articles that are often used in combination with a release liner include labels. It is often desirable to print on the non-adhesive side of the adhesive backed article. Exemplary adhesive backed articles used in retail sales environments include those articles sometimes referred to as shelf markers, shelf talkers, drum labels, and hang tags. In general, shelf markers and shelf talkers are typically a type of label found in retail stores that identify a product on a shelf and sometimes include additional information such as price and sale information. The shelf marker or shelf talker can be provided as a combination of a release liner and a label. Alternatively, shelf markers and shelf talkers can be provided as labels peeled away from liners and adhered to a surface. In general, shelf markers and shelf talkers are not, themselves, attached to goods but are rather marking the shelf where the goods can be found. Hang tags can be similar but are often hanging from something such as a shelf or rack. Hang tags sometimes have an item to be sold attached to them. Hang tags can include a relatively rigid substrate having a label adhered thereto. A drum label is typically a label that affixes to the goods being sold. Hang tags and drum labels similarly includes printed information describing, for example, the price or conditions of sale of the goods.

For labels used in the retail store environment, it is often desirable to provide the labels with a relatively consistent graphic display, and allow the retail stores to add additional information, as desired. Accordingly, it is desirable to provide sheets of labels on release liners that can be feed through printing equipment such as ink jet printers and laser printers that can be found at retail stores.

A typical release liner can be provided as a polycoated paper substrate having a silicone coating on one side to provide release properties and a friction coating on the other side to enhance handling. A polycoated paper substrate refers to a substrate prepared from a paper base sheet having a thermoplastic polyolefin coated on both sides can be referred as polycoated release liners. Exemplary thermoplastic polyolefins used to coat paper base sheets include low density polyethylene and polypropylene. Polycoated release liners generally have good dimensional stability. That is, they exhibit low shrinkage, and have little tendency to curl. A drawback of polycoated release liners is that they tend to be expensive as a result of the polyolefin. Furthermore, they tend to lack desirable stiffness. An exemplary polycoated paper substrate used in the production of shelf markers, shelf talkers, hang tags, and drum labels in retail stores can be characterized as a substrate having a basis weight of about 92 lb/3,000 ft$^2$. Such a product can be provided as a result of a paper base sheet having a basis weight of about 70 lb/3,000 ft$^2$ and a polyolefin coating on each side of about 11-12 lb/3,000 ft$^2$.

SUMMARY OF THE INVENTION

A release liner is provided according to the present invention. The release liner includes a clay coated paper substrate having a first surface and a second surface, a silicone coating provided on one of the first surface or the second surface of the clay coated paper substrate, and a friction coating provided on the other of the first surface of the second surface of the clay coated paper substrate. The clay coated paper substrate includes a paper base sheet having a first side, a second side, and a basis weight of about 50 lb/3,000 ft$^2$ to about 100 lb/3,000 ft$^2$, and a clay coating on each of the paper base sheet first side and second side at a weight of about 0.75 lb/3,000 ft$^2$ to about 10 lb/3,000 ft$^2$ per side.

A laminate comprising a release liner and an adhesive backed article are provided according to the present invention. The laminate includes a release liner, and an adhesive backed article comprising a substrate and an adhesive provided on the substrate, wherein the adhesive on the adhesive backed article and the release layer on the release liner are in contact.

A method for manufacturing a release liner is provided according to the present invention. In addition, a method for using a release liner or a laminate is provided according to the invention.

BRIEF DESCRIPTION OF THE DRAWINGS

FIG. 1 is a diagrammatic representation of a combination release liner and adhesive backed article according to the principles of the present invention.

DETAILED DESCRIPTION

An adhesive backed article can be provided on a release liner and the combination can be referred to as a laminate. When the adhesive backed article is characterized as a label, the laminate can be referred to as a label laminate. A label can have an adhesive layer on one side and a printing surface on the other side. The adhesive layer can be provided as a continuous layer of adhesive or as a discontinuous layer of adhesive such as a pattern of adhesive that provides the label with adhesive properties. The printing surface allows one to print information on the label. Typically, one can print information on the printing surface of the label using a printer such as an ink jet printer or a laser printer. The adhesive layer of the label can be provided adjacent to a release surface of a release liner. To facilitate printing on the display surface of the label, the surface on the release liner opposite the release layer can include a friction coating to assist with feeding through paper handling equipment such as a printer or a copier machine.

Now referring to FIG. 1, a diagrammatic representation of an exemplary label laminate is shown at reference number 10. It should be understood that the various thicknesses of the layers shown are not drawn to scale.

The label laminate 10 includes a label 12 and a release liner 14. The label 12 includes a label substrate 20 having a first surface 22 and a second surface 24. The label substrate first surface 22 can include an adhesive layer 26 provided thereon. The label substrate second surface 24 can include a print receptive layer 28 thereon. The print receptive layer 28 can be provided to allow for receipt of ink on the label 12. It should be understood that the label 12 need not include the print receptive layer 28 if printing can be applied directly to the label substrate second surface 24. In many embodiments of the label 12, it is expected that a print receptive layer 28 would be advantageous to facilitate printing thereon because the label substrate second surface 24 may not readily accept printing. An example of a label substrate 20 that may not readily accept printing is a vinyl film. The release liner 14 includes a release liner substrate 30 having a release liner first surface 32 and a release liner second surface 34, a friction coating 36 provided on the release liner first surface 32, and a release layer 38 provided on the release liner substrate second surface 34.

The release liner can be provided having a non-release surface exhibiting desirable friction properties so that the release liner and the label laminate can be conveniently processed on sheet processing equipment such as a printer. The release liner can be prepared from a clay coated paper substrate and exhibit desirable dimensional stability. Furthermore, the release liner prepared from a clay coated paper substrate can include increased stiffness compared with a release liner prepared from polycoated paper and having the same or less thickness. An increased stiffness at the same thickness (or about the same stiffness at a lower thickness) can be advantageous for processing the label laminate. In general, polycoated paper refers to a paper substrate coated with a thermoplastic polymer such as low density polyethylene or polypropylene. Polycoated paper suffers from the disadvantage of being relatively expensive per unit weight compared with, for example, clay coated paper. Furthermore, in general, clay coated paper can be subjected to a higher temperature without damage compared to polycoated paper. This means that a clay coated paper substrate can receive a wider range of release coatings that cure at a higher temperature to provide a release layer. Certain release coatings may require curing at relatively high temperatures that would cause a thermoplastic polymer of a polycoated paper substrate to melt or become soft and thereby damaged.

The release liner includes a clay coated paper substrate having a friction coating on one surface and a silicone coating on the other surface. It should be understood that the reference to a "silicone coating" and to a "friction coating" generally refers to a dried or cured coating on, for example, the clay coated paper substrate. The reference to a "silicone coating composition" and to a "friction coating composition," in contrast, generally refers to fluid composition that can be applied to the clay coated paper substrate and dried or cured to form the silicone coating or the friction coating, respectively. This difference is apparent from the description context, and is meaningful for understanding the weight ranges. For example, a weight range for a "coating" refers to a dry weight, and a weight range for a "coating composition" refers to a fluid or liquid weight.

The silicone coating is provided so that the release liner exhibits release properties on one side, and the friction coating is provided so that the release liner exhibits friction properties on the other side so that the label laminate can be processed through sheet processing equipment more effectively than in the absence of the friction coating. The friction coating on the release liner enhances the ability to feed the label laminate through sheet processing equipment and thereby decreasing the chances of misfeeding or jamming of the sheet processing equipment. In addition to printers, other types of sheet processing equipment include copiers and sorters. Label laminates can be stacked and fed through a printer for printing on the print receptive surface of the label. The label laminate can be provided as a sheet having a single label thereon or having multiple labels thereon. In the case of the label laminate being provided as a sheet having multiple labels thereon, the sheet can be scored or perforated. The label can be scored or perforated so that individual labels can be removed from a continuous release liner. Alternatively, the scoring or perforation can extend through the label and the release liner so that multiple label laminates can be provided from a single sheet. In certain applications, the label can be peeled away from the release liner, and the label can be used independent of the release liner. Alternatively, the label and the release liner can be used together. In various retail environments, it is expected that the label laminate will be used to provide a consumer with information. Certain sources of information that are provided in retail stores can be referred to as shelf markers and shelf talkers. In general, shelf markers and shelf talkers are provided on the shelves of the retail store where goods are displayed for purchase. The shelf talkers and shelf markers often include price information as well as other sale information. For example, certain sales information can include the length of a "sale" and the price. Another form or label can be referred to as a hang tag. Another type can be referred to as a drum label. In general, a drum label attaches to the item being sold. One way to attach a drum label to an item being sold is to remove the label from the release liner and adhesively fix the label to the item. Accordingly, the label laminate can be used to provide information without separating the label from the release liner. If desired, the label can be peeled away from the release liner and used independently of the release liner.

The release liner substrate can be provided as a clay coated paper substrate. Clay coated paper can be provided as a desirable substrate for a release liner because it is relatively inexpensive and provides dimensional stability and stiffness so that it can be processed by sheet processing equipment. Clay coated paper can be prepared by coating a paper base sheet with a clay containing composition to help close the pores in the paper base sheet.

The paper base sheet can be prepared from natural fiber, synthetic fiber, or a mixture of natural fiber and synthetic fiber. Natural fiber refers to fiber formed from plants or animals. Natural fibers are not fibers that are formed as a result of extrusion or spinning. The natural fibers can be obtained from a source of fiber using techniques such as chemical pulping, chemical mechanical pulping, semi chemical pulping, or mechanical pulping. Natural fibers from plants are often referred to as cellulosic fibers. Exemplary natural fibers that can be used to form the base sheet include wood fibers and non-wood natural fibers such as vegetable fibers, cotton, various straws (e.g., wheat and rye), various canes (e.g., bagasse and kenaf), silk, animal fiber, (e.g., wool), grasses (e.g., bamboo, etc.), hemp, corn stalks, abaca, eucalyptus, etc. Examples of synthetic fibers that could be used for the base sheet include polyacrylic fiber, polyethylene fiber, polypropylene fiber, polylactide fiber, rayon, and nylon fiber.

Wood fiber can be obtained from wood pulp, which can include hardwood fibers, softwood fibers, or a blend of hardwood fibers and softwood fibers. The pulp can be provided as cellulose fiber from chemical pulped wood, and can include a blend from coniferous and deciduous trees. By way of example, wood fibers can be from northern hardwood, northern softwood, southern hardwood, southern softwood, or any blend thereof. Hardwood fibers tend to be more brittle but are generally more cost effective for use because the yield of pulp from hardwood is higher than the yield of pulp from softwood. Softwood fibers have desired paper making characteristics but are generally more expensive than hardwood fibers.

The natural fibers can be extracted with various pulping techniques. For example, mechanical or high yield pulping can be used for stone ground wood, pressurized ground wood, refiner mechanical pulp, and thermomechanical pulp. Chemical pulping can be used incorporating kraft, sulfite, and soda processing. Semi-chemical and chemi-mechanical pulping can also be used which includes combinations of mechanical and chemical processes to produce chemi-thermomechanical pulp. Natural fibers can be bleached or unbleached.

The pulp can include a recycle source for reclaimed fiber. Exemplary recycle sources include post-consumer waste (PCW) fiber, office waste, and corrugated carton waste. Post-consumer waste fiber refers to fiber recovered from paper that is recycled after consumer use. Office waste refers to fiber obtained from office waste, and corrugated carton waste refers to fiber obtained from corrugated cartons. Additional sources of reclaimed fiber include newsprint and magazines. Reclaimed fiber can include both natural and synthetic fiber.

The refining of the fibers can be selected to enhance formation and fiber development. The level of fiber refining can be selected to help reduce penetration of the silicone composition into the paper base sheet. In general, the silicone composition can be fairly expensive and it is desirable to reduce absorption of the silicone composition into the paper base sheet. As a result, refining the fibers can help reduce penetration of the silicone composition into the paper base sheet, and can help hold the silicone composition as a release layer on the surface of the paper base sheet.

The paper base sheet can be provided having a basis weight that provides the release liner with desired stiffness and enables the release liner or laminate including the release liner to be processed through sheet processing equipment. For example, the paper substrate can be provided having a basis weight of about 50 lb/3,000 ft$^2$ to about 100 lb/3,000 ft$^2$. Alternatively, the paper substrate can be provided having a basis weight of about 75 lb/3,000 ft$^2$ to about 95 lb/3,000 ft$^2$, and can be provided having a basis weight of about 80 lb/3,000 ft$^2$ to about 90 lb/3,000 ft$^2$.

The porosity of the paper base sheet can be controlled by closing the pores of the paper base sheet. Closing the pores of the paper base sheet can be desirable to reduce the penetration of the silicone composition into the paper base sheet. By reducing the penetration of the silicone composition into the paper base sheet, it is possible to enhance or increase the amount of silicone composition remaining of the surface of the paper base sheet and thereby use less silicone composition than if the silicone composition penetrates into the paper base sheet. Techniques for reducing penetration of silicone composition into the paper base sheet include providing a finish on the paper base sheet and surface treating the paper base sheet. A finish that can be provided on the base sheet includes a clay coating. Exemplary surface treatments that can be used to help reduce penetration of the silicone composition into the paper base sheet include machine calendaring and super calendaring. The paper base sheet can include a clay coating and can include a machine finish or a machine glazed finish.

The clay coating on the paper base sheet can be provided in an amount sufficient to help close the pores on the paper base sheet. The amount of the clay coating should not be so great that the clay coating detrimentally interferes with the release properties of the silicone coating or increases the thickness of the resulting laminate to a level that is undesirable for processing through sheet feeding equipment. Furthermore, the clay coating should be selected so that it is compatible with the silicone coating so that the silicone composition cures on the clay coating and the resulting silicone coating sticks to the clay coating. The clay coating should additionally seal the paper substrate yet avoid blistering when curing the silicone composition. The paper base sheet can include a clay coating at a dry weight of about 0.75 lb/3,000 ft$^2$ to about 10 lb/3,000 ft$^2$ per side. The paper base sheet can include a clay coating at a dry weight of about 0.8 lb/3,000 ft$^2$ to about 4 lb/3,000 ft$^2$, or about 0.9 lb/3,000 ft$^2$ to about 2 lb/3,000 ft$^2$.

The silicone coating provides a release surface that allows an adhesive backed article applied to the release surface to be removed from the release surface so that it can then be applied to another surface. Typically, it is the adhesive portion of the adhesive backed article that contact the release surface of the release liner. The phrase "silicone coating" refers to a coating provided on the release liner substrate that functions as a release surface. In general, the silicone coating can be characterized as a cured coating or a dried coating. The phrase "silicone composition" refers to a composition that can be applied to a release liner substrate to form a silicone coating once the silicone composition has cured, dried, or both cured and dried. The silicone composition can include water as a carrier, an organic solvent as a carrier, or can be characterized as solventless. Once the silicone composition has been applied as a coating and allowed to dry or cure, it can be characterized as a silicone coating. The silicone composition can be characterized as a polysiloxane composition. An exemplary polysiloxane composition includes polydimethylsiloxane. Silicone compositions useful for providing a release surface on a release liner are known. Exemplary silicone compositions that can be used included silicone compositions available from Dow Corning under the name "Syl-Off." The silicone composition applied to a clay coated paper substrate can include silicone, solvent (e.g., organic solvent or water), crosslinker, catalyst, and release additive to provide a desired level of release.

The silicone composition can be provided as a composition that cures at a relatively low temperature or at a relatively high temperature. The phrase "relatively low cure temperature" refers to a cure temperature range normally associated with the application of a silicone compositions to polycoated paper. A "relatively high cure temperature" refers to a cure temperature range that may harm a polycoated paper substrate if the silicone composition is applied to the polycoated paper substrate and cured at that temperature. For example, the silicone composition can be provided as a composition that cures as a result of subjecting the silicone composition to a temperature of greater than about 230° F. In addition, the silicone composition can be selected as a composition that cures when subjected to a temperature greater than about 250° F. or greater than about 270° F. The thermoplastic polymer of a polycoated paper substrate often begins melting at about 200° F. to about 220° F. Therefore, the use of a silicone composition that cures at a temperature greater than about 230° F., greater than about 250° F., or greater than about 270° F. may damage a polycoated paper substrate but may be compatable with a clay coated substrate. Because silicone compositions having a relatively high cure temperature can be applied to a clay coated paper substrate, a greater range of adhesives are available for use with the release liner prepared from a clay coated paper substrate. Furthermore, certain adhesives may be more compatible with a release liner prepared from a silicone composition cured at a relatively high cure temperature.

The clay coated paper substrate can include the silicone composition in an amount sufficient to provide the desired release properties. In general, it is expected that this means the clay coated paper substrate can be provided having a dry weight of about 0.2 lb/3,000 ft$^2$ to about 2.0 lb/3,000 ft$^2$, about 0.4 lb/3,000 ft$^2$ to about 1.5 lb/3,000 ft$^2$, or about 0.5 lb/3,000 ft$^2$ to about 1.0 lb/3,000 ft$^2$.

The release liner substrate can be selected so that it has properties that are desirable for a release liner. In general, a release liner should be sufficiently processable so that it can be processed through sheet processing equipment without jamming whether it is being processed alone or as part of a laminate. If the release liner is too flimsy or too rigid, it may be difficult to handle.

The release liner substrate can be provided as a clay coated paper substrate. The thickness of the release liner substrate can be controlled to provide the release liner with desired stiffness and to provide the label laminate with desired processing characteristics through sheet processing equipment. The thickness of the release liner substrate can be about 2.5 mil to about 10 mil, and can be about 4.5 mil to about 6.5 mil according to a caliper measurement.

The friction coating composition can be applied to the side of the clay coated paper substrate opposite the side having the silicone composition to provide a friction coating. The friction coating composition can be applied to the clay coated paper substrate before or after application of the silicone composition.

The friction coating composition includes a particle component, a binder component, and a carrier or diluent. Upon application of the friction coating composition to the clay coated paper substrate, the carrier or diluent evaporates leaving the particle component and the binder component. In general, the binder component holds the particle component to the clay coated paper substrate and the mineral particle component provides the surface of the clay coated paper substrate with enhanced friction properties. In general, enhanced friction properties refer to a coefficient of friction greater than the coefficient of the clay coated paper substrate surface not resulting from application of a friction coating composition thereto.

The particle component can be provided as a mineral particle component or a non-mineral (e.g., organic) particle component. It is desirable for the particle component to be relatively hard and have a roughly spherical shape and a size sufficient to provide enhanced roughness or friction. The particle component can have a hardness of at least 2 according to the MOHS Scale of Mineral Hardness. In addition, the shape of the particle component can be sufficiently spherical so that bumps protrude from the surface of the clay coated paper substrate to enhance the coefficient of friction. Exemplary particle components include mineral particle components such as pigments. The particle component can have a diameter that allows for enhanced friction properties. For example, the particle component can have a diameter of about 0.25 micron to about 3 microns, a diameter of about 0.5 micron to about 2 microns, and about 0.7 micron to about 1.5 micron. Exemplary minerals or pigments that can be used as the mineral particle component include calcium carbonate, calcite, quartz, titanium dioxide, iron (II) oxide, iron (III) oxide (hematite), cadmium sulfide, cadmium selenide, chromite, cobalt aluminate, zinc oxide, and mixtures thereof.

The friction coating composition can be applied to the surface of the paper substrate in a form that allows it to be applied to the paper substrate and level to provide a relatively even distribution of the coating composition across the surface of the paper substrate. The relative amounts of the solids content and the carrier or diluent can be selected depending on the viscosity of the composition and the desired dry application weight. The friction coating composition can be applied as a composition having a solids content of about 20 wt. % to about 80 wt. %, and a carrier or diluent content of about 20 wt. % to about 80 wt. %. Furthermore, the friction coating composition can be provided as a composition having a solids content of about 30 wt. % to about 70 wt. % and about 40 wt. % to about 60 wt. %, and can be provided having a carrier or diluent content of about 30 wt. % to about 70 wt. % and about 40 wt. % to about 60 wt. %. The weight ratio of the particle component to the binder can be about 1:4 to about 8:1. An exemplary friction coating composition that can be used includes WKIFWO598493 available from Sun Chemical Corp. When used, this composition can be diluted to about 50 wt. % solids to provide a desired dried coating weight.

The friction coating composition can be applied to the clay coated paper substrate to provide a friction coating having a desired coefficient of friction. In general, the dry weight of the friction coating on the clay coated paper substrate can be about 0.5 lb/3,000 ft$^2$ to about 5 lb/3,000 ft$^2$. In addition, the dry weight of the friction coating on the clay coated paper substrate can be about 0.5 lb/3,000 ft$^2$ to about 3 lb/3,000 ft$^2$, or about 0.75 lb/3,000 ft$^2$ to about 2 lb/3,000 ft$^2$.

The various coating compositions can be applied to the paper base sheet "on machine" or "off machine." Application of a coating composition "on machine" means that the coating composition is applied relatively soon after to the paper base sheet as it is formed. That is, the coating composition is applied to the paper base sheet after it is formed but before it is taken up in a roll and moved to a location off line from the papermaking machine. Clay coating compositions are typically applied to a paper base sheet "on machine." The phrase "off machine" means that once the paper base sheet is formed, it is transferred to another line where the coating composition is applied to the paper base sheet. The silicone composition and the friction coating composition can be applied either on machine or off machine.

The equipment used in a particular operation may vary from facility to facility, but it is expected that many of the general operations will be present. In addition, it should be understood that various additional steps, if desired, can be included in the process. A composition can be applied to the paper base sheet or to the clay coated paper substrate "on machine" at a size press or other type of coater. Exemplary coaters include puddle coaters, film coaters, blade coaters, gate roll coaters, three roll coaters, etc.

The silicone composition and the friction coating composition can be applied to the clay coated paper substrate "off machine" using a metering rod coater, gravure coater, multi-roll coater, or other type of coater. Silicone coaters are generally known and can be used to apply the silicone composition. In general, the silicone coater puts down the silicone composition, and causes the silicone composition to dry and/or allows it to cure. The silicone coater can apply the silicone composition to a substrate in an operation separate from the manufacturer of the substrate itself.

The clay coated paper substrate that receives a silicone composition can be staged at an unwind station of a coater and passed through the coating station where the silicone composition is applied. Similarly, the clay coated paper substrate that receives the friction coating can be stages at an unwind station of a coater and passed through the coating station where the friction coating is applied.

Upon exiting the coating station the substrate passes through an oven section that may be made up of several dryer zones. Heat in the oven section drives off any volatile components in the silicone composition and cures the coating to create a hard and durable surface that is low in surface energy so that other materials such as adhesives, resin fiber coatings, and foams, can be easily removed from the surface in subsequent manufacturing operations.

To cool the cured silicone coating, and the liner substrate to which it has been applied, the substrate can then pass through one or more cooling stations. Optionally, moisture can be added to the silicone coated substrate through the use of jet steamers. The coated, cured, and cooled product is then wound up at a wind-up station and removed from the coating machine.

Once the release liner has been prepared, the label laminate can be assembled. In one technique, the adhesive layer can be applied to the release layer of the release liner, and the label substrate can be applied over the adhesive layer. If desired, the print receptive layer can already be provided on the label substrate or can be subsequently provided on the label substrate. In an alternative technique, the label can be assembled and then applied to the release liner. The label can be provided as a conventional label. An exemplary label can be provided having a label substrate provided as a film such as a vinyl film, and a print receptive layer such as a primer so that the print receptive layer can receive printing.

The above specification provides a complete description of the manufacture and use of the compositions and articles of the invention. Since many embodiments of the invention can be made without departing from the spirit and scope of the invention, the invention resides in the claims hereinafter appended.

We claim:

1. A release liner comprising:
   (a) a clay coated paper substrate having a first surface and a second surface, the clay coated paper substrate comprising a paper base sheet having a first side, a second side, and a basis weight of about 50 lb/3,000 ft$^2$ to about 100 lb/3,000 ft$^2$, and a clay coating on each of the paper base sheet first side and second side at a weight of about 0.75 lb/3,000 ft$^2$ to about 10 lb/3,000 ft$^2$ per side;
   (b) a silicone coating provided on one of the first surface or the second surface of the clay coated paper substrate to provide a release layer having release properties; and
   (c) a friction coating provided on the other of the first surface or the second surface of the clay coated paper substrate to provide a friction surface, wherein the friction coating comprises a mineral component having a diameter of about 0.25 microns to about 3 microns and a binder, wherein the weight ratio of the mineral component to the binder is about 1:4 to about 8:1.

2. A release liner according to claim 1 wherein the mineral component comprises at least one of calcium carbonate, calcite, quartz, titanium dioxide, iron (II) oxide, iron (III) oxide (hematite), cadmium sulfide, cadmium selenide, chromite, cobalt aluminate, zinc oxide, and mixtures thereof.

3. A release liner according to claim 1 wherein the paper base sheet has a basis weight of about 75 lb/3,000 ft$^2$ to about 95 lb/3,000 ft$^2$.

4. A release liner according to claim 1 wherein the clay coated paper substrate has a caliper thickness of about 2.5 mil to about 10 mil.

5. A release liner according to claim 1 wherein the clay coated paper substrate has a clay coating on each side of the paper base sheet at a weight of about 0.8 lb/3,000 ft$^2$ to about 4 lb/3,000 ft$^2$.

6. A release liner according to claim 1, wherein the friction coating has a coat weight of about 0.5 lb/3,000 ft$^2$ to about 5 lb/3,000 ft$^2$.

7. A release liner according to claim 1 wherein the friction coating comprises a mineral component having a diameter of about 0.5 microns to about 2 microns.

8. A release liner according to claim 1 wherein the friction coating comprises a mineral component having a diameter of about 0.7 microns to about 1.5 microns.

9. A release liner according to claim 1 wherein the mineral component has a hardness of at least 2 according to the MOHS Scale of Mineral Hardness.

10. A release liner according to claim 1, wherein the friction coating has a coat weight of about 0.75 lb/3,000 ft$^2$ to about 2 lb/3,000 ft$^2$.

11. A release liner according to claim 1, wherein the friction coating provides a coefficient of friction greater than a coefficient of friction of the clay coated paper substrate without the friction coating provided thereon.

12. A laminate comprising a release liner and an adhesive backed article wherein:
   (a) the release liner comprises:
      (i) a clay coated paper substrate having a first surface and a second surface, the substrate comprising a paper base sheet having a first side, a second side, and a basis weight of about 50 lb/3,000 ft$^2$ to about 100 lb/3,000 ft$^2$, and a clay coat on each of the paper base sheet first side and second side at a weight of about 0.75 lb/3,000 ft$^2$ to about 10 lb/3,000 ft$^2$ per side;
      (ii) a silicone coating provided on one of the first surface or the second surface of the clay coated paper substrate to provide a release layer having release properties; and
      (iii) a friction coating provided on the other of the first surface or the second surface of the clay coated paper substrate to provide a friction surface, wherein the friction coating comprises a mineral component having a diameter of about 0.25 microns to about 3 microns and a binder, wherein the weight ratio of the mineral component to the binder is about 1:4 to about 8:1; and (b) the adhesive backed article comprising a substrate and adhesive provided on the substrate, wherein the adhesive on the adhesive backed article and the release layer on the release liner are in contact.

13. A laminate according to claim 12 wherein the mineral component comprises at least one of calcium carbonate, calcite, quartz, titanium dioxide, iron (II) oxide, iron (III) oxide (hematite), cadmium sulfide, cadmium selenide, chromite, cobalt aluminate, zinc oxide, and mixtures thereof.

14. A laminate according to claim 12 wherein the paper base sheet has a basis weight of about 75 lb/3,000 ft$^2$ to about 95 lb/3,000 ft$^2$.

15. A laminate according to claim 12 wherein the clay coated paper substrate has a caliper thickness of about 2.5 mil to about 10 mil.

16. A laminate according to claim 12 wherein the clay coated paper substrate has a clay coating on each side of the paper base sheet at a weight of about 0.8 lb/3,000 ft$^2$ to about 4 lb/3,000 ft$^2$.

17. A laminate according to claim 12, wherein the friction coating has a coat weight of about 0.5 lb/3,000 ft$^2$ to about 5 lb/3,000 ft$^2$.

18. A laminate according to claim 12 wherein the friction coating comprises a mineral component having a diameter of about 0.5 microns to about 2 microns.

19. A laminate according to claim 12 wherein the friction coating comprises a mineral component having a diameter of about 0.7 microns to about 1.5 microns.

20. A laminate according to claim 12, wherein the mineral component has a hardness of at least 2 according to the MOHS Scale of Mineral Hardness.

21. A laminate according to claim 12, wherein the friction coating has a coat weight of about 0.75 lb/3,000 ft$^2$ to about 2 lb/3,000 ft$^2$.

22. A laminate according to claim 12, wherein the friction coating provides a coefficient of friction greater than a coefficient of friction of the clay coated paper substrate without the friction coating provided thereon.

\* \* \* \* \*